July 24, 1962 A. E. BILYEU 3,046,192
SCENT FOR ATTRACTING WILD GAME AND METHOD FOR ITS USE
Filed Feb. 12, 1959 2 Sheets-Sheet 1

INVENTOR.
ARCHIE E. BILYEU
BY Braddock and Braddock
ATTORNEYS

INVENTOR.
ARCHIE E. BILYEU

United States Patent Office 3,046,192
Patented July 24, 1962

3,046,192
SCENT FOR ATTRACTING WILD GAME AND METHOD FOR ITS USE
Archie E. Bilyeu, Joice, Iowa, assignor to Aladdin Manufacturing Company, Minneapolis, Minn., a corporation of Minnesota
Filed Feb. 12, 1959, Ser. No. 792,825
7 Claims. (Cl. 167—48)

This invention has relation to a composition of matter which, when heated and propagated into the atmosphere as a scent, will result in attracting wild animals toward the source of such a scent. The invention also has relation to a method for heating and propagating such a scent into the atmosphere.

A wild animal scent lure made according to the present invention can include a scent which is sexually stimulating to animals, a scent which will arouse the curiosity of such animals, and a scent which will be attractive from the standpoint of smell and/or taste.

An example of an effective combination of substances which will sexually stimulate a wild animal includes an essence made from the pulverized musk or scent glands of a wild animal to which has been added the urine of one or more such animals. To be most effective, such a mixture should be warmed at least to a temperature approximating body temperature of such animal.

Several other substances or combinations of substances are known to have the effect of sexually stimulating certain wild animals. It has been found that these substances will be disproportionately more effective when they are heated at least to the body temperature of such animal.

One substance seemingly effective to arouse the curiosity and interest of wild animals has been found to be comparatively minute quantities of skunk scent. Such scent can, of course, not be present in sufficient quantity to be objectionable or to be a deterrent to investigation by an animal; but will be present in sufficient quantity to cause the animal to be alerted to the presence of an unusual scent.

"Skunk scent" is also known as the "defensive granular secretion from a skunk" and as "oil of skunk." It is contained in a pouch beneath the tail of the skunk. The existence of this "quintessence of diabolical stench" has been well known since skunks began, and has been described in many printed publications. For example, see page 151 of Bison's "Complete American Trapper" published in 1876 by James Miller in New York.

Substantially equally effective as a scent derived directly from skunk is a skunk-like scent. This scent can be derived from several sources including, for example, mink. A skunk-like scent would be effective even if it were to be synthetically obtained.

Another scent desirably present in a composition of matter made according to the invention is a scent which will be attractive to the wild animal from the standpoint of its sense of smell and/or taste. A combination of essence of peppermint and oil of anise has been found effective for this purpose. It is believed that this combination of ingredients, in addition to being pleasant to wild animals as far as their sense of smell or as a suggestion of a pleasant taste is concerned, is also effective to stimulate the curiosity or arouse the interest of the wild animal as to the presence or possible presence of something strange in its environment which should be investigated.

A composition made according to the invention will also be effective to mask the man-scent.

A method for propagating this composition of matter into the atmosphere includes the steps of disbursing the composition through a porous material, subjecting the porous matter so impregnated to heat to cause the composition of matter to be volatilized, the sexual stimulation agents to be activated, and the combined scents to be driven off. The method has been found to be most effective when the heat applied to the porous material comes from the close association of such porous material with a catalytic-type warming device. Such a device gives off products of combustion which are substantially entirely odor-free. As the composition of the present invention is volatilized, the scented vapor becomes, to an appreciable extent, entrained with the products of combustion of the catalytic-type warmer as they rise from the warmer and this action considerably increases the carrying power of the combined scents and their effective range.

Simply heating a composition of the invention in a container open to atmosphere will result in the propagation of the desired lure scent to a lesser but still effective degree.

Figure 1:
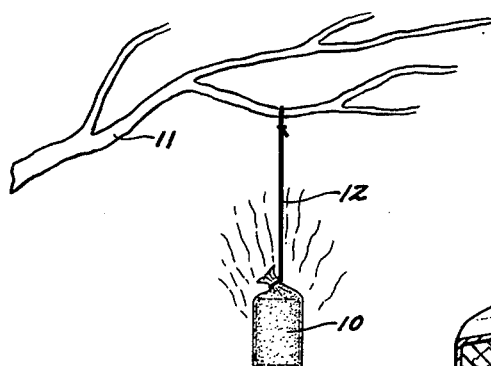
FIG. 1 illustrates the manner in which a heat-source of the present invention may be positioned on a tree to act as a center of the focus of interest and attention of wild animals coming within the effective range of the combined scents being driven off therefrom.

Referring to the drawings and numerals of reference thereon, a cloth cover 10 of a catalytic-type hand warmer is illustrated in FIG. 1 as being supported from a tree 11 by a line 12. The cloth cover 10 is illustrated as having a catalytic-type warmer inside thereof. This figure illustrates a typical positioning of the catalytic-type warmer during the performance of the method of the invention. In this position, the wild animal lure scent will be driven from the warmer through the cover 10 and into the atmosphere where it can alert and attract wild animals. Other positions for supporting the catalytic-type warmer while performing the method of the invention include the carrying of the warmer in the pocket of the hunter.

Figure 2:
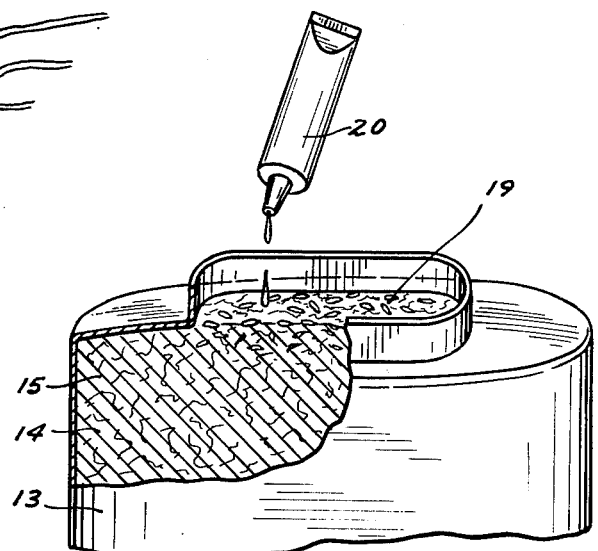
FIG. 2 is an enlarged fragmentary front elevational view of the fuel case and fuel compartment of a catalytic-type warmer of a first form of the invention illustrating one manner of applying a wild animal lure composition to the porous material in said compartment.
Figure 3:
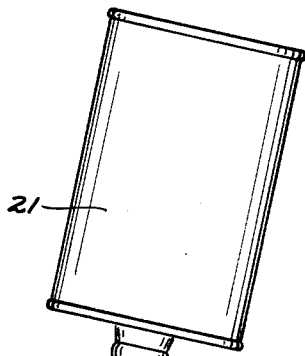
FIG. 3 is a fragmentary front elevational view of the fuel compartment of FIG. 2, illustrating the method of introducing warmer fuel into said fuel compartment to cause dispersion of the wild animal lure throughout the compartment.
Figure 4:
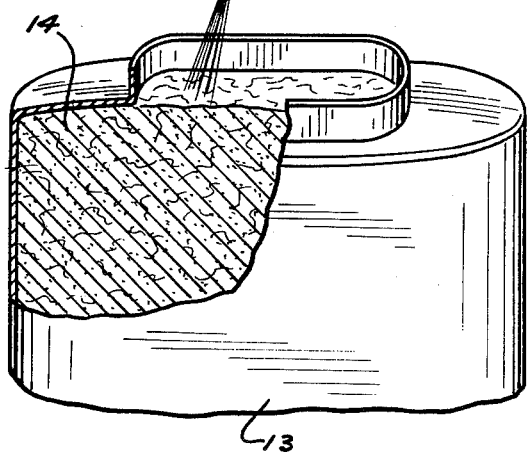
FIG. 4 is a fragmentary front elevational view at a reduced scale of the catalytic-type warmer of FIGS. 2 and 3 in operation to heat the wild animal lure and cause it to be carried off with the products of combustion of the catalytic-type warmer.
Figure 5:
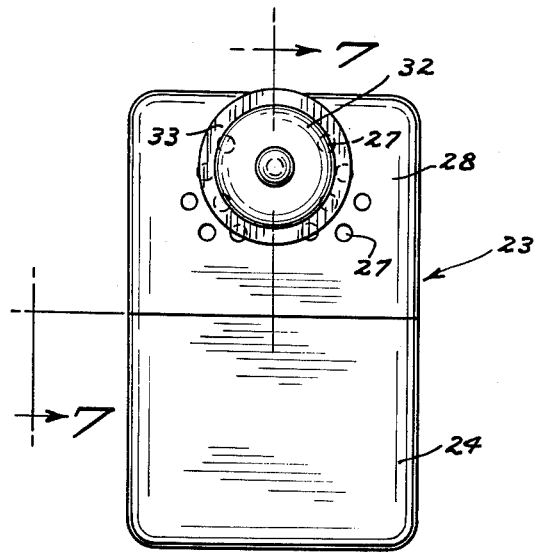
FIG. 5 is a front elevational view of a device of a second form of the invention incorporating porous material suitable for receiving wild animal lure, and of a catalytic-type hand warmer, showing the device in position with respect to said warmer to cause the wild animal lure to be heated, volatilized, and driven off.

FIGS. 2, 3 and 4 illustrate mechanism and steps for carrying out the method of the invention in accordance with a first form thereof. In these figures, a fuel case 13 encloses a fuel compartment 14 of a typical catalytic-type hand warmer. Such a typical warmer will include a fibrous or otherwise porous material 15 filling the entire fuel compartment 14. A catalytic-type warmer is disclosed in Patent No. 2,670,728 issued to John W. Smith on March 2, 1954.

In the usual operation in this type of hand warmer when not performing the method of the invention, a catalytic-type burner 16 is pre-heated until sufficient fuel from the compartment 14 and from the fibrous or porous material 15 such as wood cellulose or cotton is vaporized and carried to the burner 16 to support combustion.

When performing the method of the invention, the wild animal lure composition will be disbursed throughout the porous material 15, and it will be volatilized and carried off together with the fuel. The scent thus propagated will pass out through holes 17 in the metallic burner cover 18 of the warmer, and through the cloth cover 10 thereof into the atmosphere.

In order to cause the wild animal lure composition to be disbursed throughout the porous material 15 in the fuel compartment, several drops, for example 15 drops, of this lure composition will be deposited on the porous material 15 through a fuel entrance 19 of the fuel case 13. A suitable container 20 is shown as the source for the wild animal lure composition in FIG. 2.

This lure composition may be perhaps best caused to dissipate throughout the entire fuel compartment and throughout the entire volume of the porous material 15 by adding liquid warmer fuel on top of the lure composition from any suitable container 21 as shown in FIG. 3.

After the lure composition and fuel have been added to the warmer, the warmer is put in operation as previously suggested by pre-heating the burner 16 until sufficient fuel is volatilized to provide sufficient gaseous fumes to support combustion in the burner 16. After the warmer has become well heated, in accordance with usual and conventional practices in such warmers, the cloth cover 10 is put around it to control and somewhat limit the amount of air available to the burner 16 so that the heat of the burner will not be excessive.

The cover and warmer can then be positioned as seen in FIG. 1 as previously suggested. As the vaporized fuel is consumed, it supplies heat to insure continuous vaporizing of additional fuel. The heat thus supplied effectively vaporizes the lure composition as well to cause it to be continuously carried off into the atmosphere. When this vaporized fuel is consumed in the burner 16, it is to be understood that certain products of combustion resulting from this process are carried off into the atmosphere outwardly from the warmer. The vaporized, volatilized wild animal lure scent carried off from the burner is entrained with these products of combustion and is carried off in the same manner so as to cause the scent of the present invention to be widely disseminated throughout the atmosphere in the vicinity of the warmer.

As previously stated, this volatilizing, vaporizing action is due to the heat generated in the burner 16 and carried back into the warmer fuel compartment. The musk or scent gland and urine components of the lure composition are brought at least to a temperature approximating body temperature to the end that these components together produce a scent which is sexually stimulating to wild animals. Having been brought to this temperature and propagated into the atmosphere in the manner heretofore set out, tests indicate that this scent remains effective at least over the period of time necessary to allow it to travel to its maximum effective distance throughout the atmosphere. In other words as the scent disburses into the air in the vicinity of the warmer from which it is generated, it naturally makes up less and less of the volumetric content of the atmosphere as it permeates away from its source. Tests have shown that it remains effective, however, to at least the same distances from the source that a man-scent remains effective. The method of observing this result consisted of causing the scent of the invention to emanate from the same location as that of a man in an area where wild animals were moving from outside of the effective range of the scent and outside of the effective range of man-scent. Wild animals then moving into the outer edges of the effectiveness of the scent were observed to become alerted by the scent, interested by it, and to move in direction toward it without giving any indications of the recognition of a man-scent and consequent immediate agitation, fright and flight always associated therewith.

Mechanism for performing the method of the invention in accordance with a second form is shown in FIGS. 5 through 8. In these figures, a fuel case 24 of a catalytic-type warmer 23 of the same type as illustrated in connection with FIGS. 2 through 4 contain porous material (not shown) and fuel, as is usual in warmers of this type. A catalytic-type burner 26 is positioned over the fuel case 24 and fuel compartment as well as over a top fuel entrance (not shown) to said fuel compartment in a usual manner. A metallic burner cover 28 is provided with a plurality of holes 27 therethrough. As previously suggested in connection with the first form of the invention, these holes are for the purpose of admitting air to the burner 26 and for passing off products of combustion from the burner.

In performing the method of the invention in accordance with this second form, a lure composition receiving device 32 consists of a plate 33 and a heat resistant porous material 35 such as an absorbent, heat resistant plastic, wood cellulose or cotton batting. A retaining clip 36 extends through the plate 33 and the material 35 and has a head 37 in contact with an outside surface of said plate, and a pair of diverging fastener legs 38, 38. These fastener legs 38, 38 are designed to pass through one of the holes 27 to retain the porous material 35 of the device 32 in contiguous relationship to an outer surface of the metallic burner cover 28 through one of the holes 27 therein and adjacent other holes 27.

Figure 6:
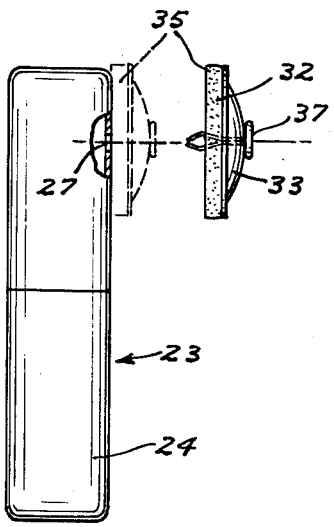
FIG. 6 is a side elevational view of the hand warmer in FIG. 5 and the lure receiving device in spaced relation thereto.

In performing the method of the invention in accordance with the second form of the mechanism, wild animal lure composition is deposited on the device 32 in the manner suggested in accordance with the showing of FIG. 2 earlier. Preferably the device 32 will be removed from the warmer 23 as shown in FIG. 6 when this is done. The porosity of material 35 will tend to cause the lure composition to permeate relatively evenly throughout the material, although the method of the invention will be effective even though this is not accomplished.

The warmer 23 will next be put into its usual and regular operation, and the device 32 will be fastened onto the burner cover 28 by forcing the diverging fastener link 38 through one of the openings 27 as previously indicated. If desired, this operation can be accomplished before the warmer is put into operation and before the cover 28 is placed over the fuel case 24.

Figure 7:
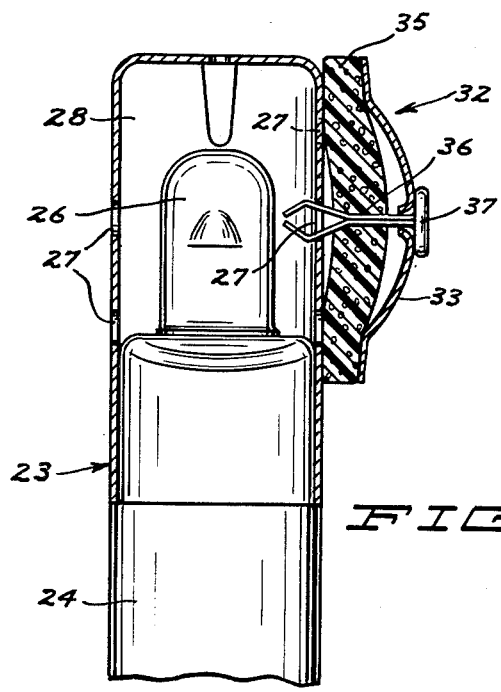
FIG. 7 is an enlarged fragmentary vertical sectional view taken substantially on the line 7—7 in FIG. 5.
Figure 8:
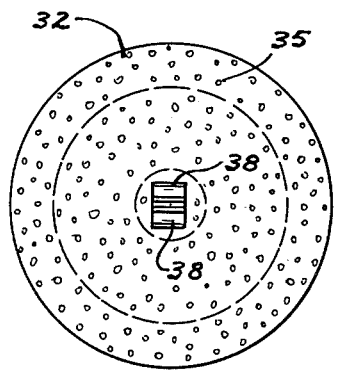
FIG. 8 is an enlarged rear view of the device for receiving the wild animal lure.

After the parts are positioned as seen in FIG. 7, the heat from the burner 26 will permeate through the burner cover 28 and into the porous material 35 to cause the wild animal lure composition to be heated and volatized and driven off both directly into the atmosphere around the edges of the material 35 and back into the burner cover through holes 27. In either case, the scent thus driven off will tend to become airborne with the products of combustion from the burner 26 and will be carried out to become effective in the manner stated in connection with the first form of the invention.

After the burning of the warmer becomes established, the cloth cover 10 may be placed over the entire warmer and lure composition receiving device 32.

It is to be noted that the heat resistant plate 33 prevents any dissipation of the lure composition in direction away from the burner. Because of this, virtually all of the composition volatilized by the heat of the burner goes into the area where it can become entrained with the products of combustion of the burner.

As previously stated, a wild animal lure composition for use with the method of the invention should contain components which will be sexually stimulating to wild animals. The effectiveness of such a lure composition will be enhanced substantially by the inclusion of components which arouse the curiosity and interest of wild animals and which are pleasing to the sense of smell or are suggestive of a pleasing taste.

One formula which has proved effective in practising the method of the invention follows:

Musk—50 drops
Urine—10 drops
Oil of anise—1/20 of a drop
Essense of peppermint—1/20 of a drop
Enough white gasoline or lighter fluid or isopropanol to make a total of 1/2 by volume.

Preferably the urine in the above mixture can be in the ratio of 9 drops of urine from a deer and one drop from a fox.

One method of preparing musk to be used in the formulation above is by collecting the essence from the ground-uptarsal or hock gland, metatarsal gland and/or interdigital glands on the front and hind feet of a deer. Interdigital glands of white tailed deer are best.

Oil of anise and essence of peppermint combine to produce a scent, which, when driven off in the manner of the invention, will be pleasing to the sense of smell and sense of taste of the wild animal and will also tend to arouse his curiosity.

A trace of skunk-like odor present in the composition will serve to arouse the curiosity of an animal within the range of the scent emanating from the composition.

As the white gas or lighter fluid or isopropanol carrier does not have any appreciable effect on the effectiveness of the scent given off, the amount of it used is not critical in this sense. The effective amount of this constituent will be determined by the fluidity desired in the end product and by the nature of the source of heat employed to perform the method of the invention.

In the above formulation, it has been found that the musk scent component can be varied from a lower limit of three drops thereof in a total composition of 1/2 ounce up to the point where 90% of the composition is this constituent. The amount of urine used in a formulation to make up one-half ounce of the composition can also be varied from a minimum of three drops to a maximum where urine comprises 90% of the composition.

The oil of anise and essence of peppermint likewise can be varied from a trace of each to a point where the total of both equal 25% of the total volume of the composition.

As previously stated, skunk-like odor can be added only up to the point where it is still not objectionable and distasteful to wild animals.

Tests of lure composition made according to the invention have indicated that many species of wild animals found in North America are attracted or lured to an effective degree by use of the method of the invention with a lure composition of the invention.

What is claimed is:

1. An animal lure scent producing composition for luring a species of animal, said composition consisting of, as its effective ingredients, at least three drops of musk, at least three drops of urine from an animal in the family including said species in a total composition of about one-half ounce.

2. An animal lure scent producing composition including as its effective ingredients about fifty drops of deer musk, nine drops of deer urine, one drop of fox urine, one-twentieth of a drop of oil of anise and one-twentieth of a drop of essence of peppermint; and sufficient liquid carrier to make a total of approximately one-half an ounce.

3. The method of attracting wild animals including the steps of:

Subjecting an animal lure scent producing composition including a component having a scent which is stimulating to animals to a temperature at least as high as the body temperature of an animal it is desired to attract to cause a scent to be driven off from said composition;

and permitting the resulting scent to permeate the atmosphere at a point to which it is desired to attract animals.

4. The method of attracting deer including the steps of:

Dispersing throughout a porous material a scent producing composition containing, as its effective ingredients, deer musk and deer urine, subjecting the composition and porous material to a temperature at least as high as the body temperature of a species of deer it is desired to attract to cause a scent to be driven off, and permitting the resulting scent to permeate the atmosphere.

5. The method as specified in claim 4 wherein said composition is subjected to a temperature during the heating step sufficient to bring the urine and musk to a temperature approximating the body temperature of the deer which it is desired to attract.

6. The method of attracting a particular species of animal including the steps of:

Dispersing throughout a porous material a scent producing compound including, as its effective in gredients, musk and urine of an animal from the family including the species, subjecting the composition to a temperature at least as high as the body temperature of animals of said species to cause a scent to be driven off, and permitting the resultant scent to permeate the atmosphere.

7. The combination as specified in claim 6 wherein the composition is subjected to a temperature during the heating step sufficient to bring the urine and musk to a temperature approximating the body temperature of an animal of said species.

References Cited in the file of this patent

UNITED STATES PATENTS

| 271,036 | Casanova | Jan. 23, 1883 |
| 1,513,138 | Tarnok | Oct. 28, 1924 |
| 1,780,407 | Smith | Nov. 4, 1930 |
| 1,792,860 | Neuls | Feb. 17, 1931 |
| 2,155,949 | Maier-Bode et al. | Apr. 25, 1939 |
| 2,263,827 | Siegler | Nov. 25, 1941 |
| 2,670,728 | Smith | Mar. 2, 1954 |
| 2,745,210 | Hild | May 15, 1956 |
| 2,851,991 | Rinck | Sept. 16, 1958 |

FOREIGN PATENTS

| 19,232 | Great Britain | 1910 |